(12) United States Patent
Ahn et al.

(10) Patent No.: US 9,984,610 B2
(45) Date of Patent: May 29, 2018

(54) IMAGE SIGNAL PROCESSING CIRCUIT FOR GAMMA ADJUSTMENT AND DISPLAY DEVICE INCLUDING THE SAME

(71) Applicant: SAMSUNG DISPLAY CO., LTD., Yongin-si, Gyeonggi-do (KR)

(72) Inventors: Kuk-Hwan Ahn, Hwaseong-si (KR); Jai-Hyun Koh, Yongin-si (KR); Heendol Kim, Yongin-si (KR); Jin-Kyu Park, Yongin-si (KR); Seokyun Son, Suwon-si (KR); Junghwan Cho, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 91 days.

(21) Appl. No.: 15/163,526

(22) Filed: May 24, 2016

(65) Prior Publication Data
US 2017/0110044 A1   Apr. 20, 2017

(30) Foreign Application Priority Data
Oct. 14, 2015   (KR) .................. 10-2015-0143571

(51) Int. Cl.
*G09G 3/20* (2006.01)
*H04N 9/69* (2006.01)
*H04N 5/202* (2006.01)

(52) U.S. Cl.
CPC .......... *G09G 3/2003* (2013.01); *H04N 5/202* (2013.01); *H04N 9/69* (2013.01); *G09G 2320/0285* (2013.01); *G09G 2320/0673* (2013.01)

(58) Field of Classification Search
CPC ................................ H04N 9/69; H04N 5/202
See application file for complete search history.

(56) References Cited

U.S. PATENT DOCUMENTS

2004/0246278 A1* 12/2004 Elliott .................. G09G 3/3607
345/692
2007/0279372 A1   12/2007 Brown Elliott et al.
(Continued)

FOREIGN PATENT DOCUMENTS

KR   10-2011-0076656 A   7/2011
KR   10-2012-0123788 A   11/2012
(Continued)

OTHER PUBLICATIONS

Korean Patent Abstracts for Korean Publication No. 1020140051199 A, Dated Apr. 30, 2014 Corresponding to Korean Patent No. 10-1569135 B1, Dated Nov. 16, 2015, 1 Page.

*Primary Examiner* — Ryan D McCulley
(74) *Attorney, Agent, or Firm* — Lewis Roca Rothgerber Christie LLP (57) ABSTRACT

A signal processing circuit includes an input gamma adjuster configured to adjust gamma characteristics of an image signal and to output a gamma adjustment image signal, an image signal processor configured to generate a scaling signal corresponding to image characteristics of the gamma adjustment image signal and to convert the gamma adjustment image signal into an intermediate data signal in response to the scaling signal, and an output gamma adjuster configured to convert the intermediate data signal into a data signal on a basis of a first lookup table corresponding to a first gamma curve, a second lookup table corresponding to a second gamma curve, and the scaling signal.

16 Claims, 12 Drawing Sheets

(56) References Cited

U.S. PATENT DOCUMENTS

| | | | | |
|---|---|---|---|---|
| 2008/0095400 A1* | 4/2008 | Nagano | ............... | H04N 5/23248 |
| | | | | 382/103 |
| 2008/0158420 A1* | 7/2008 | Um | ........................ | H04N 9/11 |
| | | | | 348/488 |
| 2008/0170083 A1* | 7/2008 | Han | ...................... | G09G 5/377 |
| | | | | 345/589 |
| 2008/0231688 A1* | 9/2008 | Luo | ...................... | H04N 5/202 |
| | | | | 348/14.09 |
| 2009/0141167 A1* | 6/2009 | Zhang | ...................... | G09G 5/02 |
| | | | | 348/455 |
| 2010/0201887 A1* | 8/2010 | Bakhmutsky | .......... | H04N 5/202 |
| | | | | 348/674 |
| 2013/0265608 A1* | 10/2013 | Yoshida | ............. | G06K 15/1878 |
| | | | | 358/2.1 |
| 2015/0009241 A1 | 1/2015 | Kim et al. | | |

FOREIGN PATENT DOCUMENTS

| | | |
|---|---|---|
| KR | 10-1279659 B1 | 6/2013 |
| KR | 10-2014-0074494 A | 6/2014 |
| KR | 10-2015-0026376 A | 3/2015 |
| KR | 10-2015-0056940 A | 5/2015 |
| KR | 10-1569135 B1 | 11/2015 |

\* cited by examiner

| RGB | RGB' | |
|---|---|---|
| | NL_GMA | L_GMA |
| 0 | 0 | 0 |
| 1 | 0 | 1 |
| 2 | 0 | 2 |
| 3 | 0 | 3 |
| 4 | 0 | 4 |
| 5 | 1 | 5 |
| 6 | 1 | 6 |
| 7 | 2 | 7 |
| 8 | 2 | 8 |
| 9 | 3 | 9 |
| 10 | 3 | 10 |
| ⋮ | ⋮ | ⋮ |

IMAGE SIGNAL PROCESSING CIRCUIT FOR GAMMA ADJUSTMENT AND DISPLAY DEVICE INCLUDING THE SAME

CROSS-REFERENCE TO RELATED APPLICATION

This U.S. non-provisional patent application claims priority to and the benefit of Korean Patent Application No. 10-2015-0143571, filed on Oct. 14, 2015 in the Korean Intellectual Property Office (KIPO), the entire content of which is hereby incorporated by reference.

BACKGROUND

1. Field

Aspects of the present disclosure relate to an image signal processing circuit and a display device including the same.

2. Description of the Related Art

In general, a display device expresses colors by using the three primary colors of red, green, and blue. Therefore, the display panel includes sub-pixels that respectively correspond to red, green, and blue. Recently, in order to increase the brightness of a display image, a technique further including a white sub-pixel is suggested. That is, a PenTile technique for designing two pixels including four sub-pixels instead of the related art two pixels including six sub-pixels is developed.

A display device employing the PenTile technique includes a rendering module for compensating resolution deterioration due to the reduction of the number of sub-pixels. The rendering module converts red, green, and blue image signals provided from the outside into red, green, blue, and white data signals and adjusts the brightness of a backlight unit, thereby improving the brightness of an image.

SUMMARY

Aspects of embodiments of the present disclosure are directed toward an image signal processing circuit for improving the quality of a display area.

Aspects of embodiments of the present disclosure are also directed toward a display device including an image signal processing circuit for improving the quality of a display area.

According to some embodiments of the present invention, there is provided a signal processing circuit including: an input gamma adjuster configured to adjust gamma characteristics of an image signal and to output a gamma adjustment image signal; an image signal processor configured to generate a scaling signal corresponding to image characteristics of the gamma adjustment image signal and to convert the gamma adjustment image signal into an intermediate data signal in response to the scaling signal; and an output gamma adjuster configured to convert the intermediate data signal into a data signal on a basis of a first lookup table corresponding to a first gamma curve, a second lookup table corresponding to a second gamma curve, and the scaling signal.

In an embodiment, the input gamma adjuster is configured to convert the image signal into the gamma adjustment image signal by referring to a linear gamma curve when the image signal is in a low grayscale section, and to convert the image signal into the gamma adjustment image signal by referring to a non-linear gamma curve when the image signal is in a high grayscale section.

In an embodiment, the first gamma curve is a linear inverse gamma curve and the second gamma curve is a non-linear inverse gamma curve.

In an embodiment, the output gamma adjuster is configured to convert the intermediate data signal into the data signal on a basis of the first lookup table, the second lookup table, and the scaling signal when the intermediate data signal is in a low grayscale section, and to convert the intermediate data signal into the data signal on a basis of the second lookup table when the intermediate data signal is in a high grayscale section.

In an embodiment, the output gamma adjuster includes: a first memory configured to store the first lookup table; a second memory configured to store the second lookup table; and a gamma adjustor configured to convert the intermediate data signal into a data signal on a basis of the first lookup table, the second lookup table, and the scaling signal.

In an embodiment, the output gamma adjuster outputs a value calculated by $LUT1(x)+[\{(LUT2(x)-LUT1(x))\times(S-SV)\}/(S/2)]$ as the data signal, where x is the intermediate data signal, LUT1 is the first lookup table, LUT2 is the second lookup table, SV is the scaling signal, and S is a maximum scaling value.

In an embodiment, the image signal processor includes: a backlight controller configured to generate a scaling signal corresponding to the image characteristics of the gamma adjustment image signal, and to generate a backlight control signal corresponding to the image characteristics; and an image signal processing circuit configured to convert the gamma adjustment image signal into an intermediate data signal in response to the scaling signal.

In an embodiment, the image signal includes a first color signal, a second color signal, and a third color signal, and the intermediate data signal includes the first color signal, the second color signal, the third color signal, and a fourth color signal.

According to some embodiments of the present invention, there is provided a display device including: a display panel including a plurality of pixels configured to display an image corresponding to each data signal; and a signal processing circuit configured to receive an image signal and to convert the image signal into the data signal to provide the converted data signal to the display panel, wherein the signal processing circuit includes: an input gamma adjuster configured to adjust gamma characteristics of the image signal and to output a gamma adjustment image signal; an image signal processor configured to generate a scaling signal corresponding to image characteristics of the gamma adjustment image signal and to convert the gamma adjustment image signal into an intermediate data signal in response to the scaling signal; and an output gamma adjuster configured to convert the intermediate data signal into a data signal on a basis of a first lookup table and utilizing a first gamma curve, a second lookup table and utilizing a second gamma curve, and the scaling signal.

In an embodiment, the input gamma adjuster is configured to convert the image signal into the gamma adjustment image signal by referring to a linear gamma curve when the image signal is in a low grayscale section, and to convert the image signal into the gamma adjustment image signal by referring to a non-linear gamma curve when the image signal is in a high grayscale section.

In an embodiment, the first gamma curve is a linear inverse gamma curve and the second gamma curve is a non-linear inverse gamma curve.

In an embodiment, the output gamma adjuster is configured to convert the intermediate data signal into the data signal on a basis of the first lookup table, the second lookup table, and the scaling signal when the intermediate data signal is in a low grayscale section, and to convert the intermediate data signal into the data signal on a basis of the second lookup table when the intermediate data signal is in a high grayscale section.

In an embodiment, the output gamma adjuster outputs a value calculated by $LUT1(x)+[\{(LUT2(x)-LUT1(x))\times(G-SV)\}/(G/2)]$ as the data signal, where x is the intermediate data signal, LUT1 is the first lookup table, LUT2 is the second lookup table, SV is the scaling signal, and G is a maximum grayscale level.

In an embodiment, the image signal processor includes: a backlight controller configured to generate a scaling signal corresponding to the image characteristics of the gamma adjustment image signal, and to generate a backlight control signal corresponding to the image characteristics; and an image signal processing circuit configured to convert the gamma adjustment image signal into an intermediate data signal in response to the scaling signal.

In an embodiment, the image signal corresponding to each of the plurality of pixels includes a first color signal, a second color signal, and a third color signal, and the intermediate data signal corresponding to each of the plurality of pixels includes the first color signal, the second color signal, the third color signal, and a fourth color signal.

In an embodiment, a first pixel among the plurality of pixels includes a first sub-pixel and a second sub-pixel respectively corresponding to the first color signal and the second color signal, and a second pixel among the plurality of pixels includes a third sub-pixel and a fourth sub-pixel respectively corresponding to the third color signal and the fourth color signal.

In an embodiment, the first pixel and the second pixel are adjacent to each other.

In an embodiment, the display device further includes: a gate driver configured to sequentially select the plurality of pixels of the display panel; a data driver configured to provide a driving voltage corresponding to the data signal to pixels selected by the gate driver from among the plurality of pixels; and a backlight configured to provide light to the display panel in response to a backlight control signal.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Hereinafter, embodiments of the inventive concept are described in more detail with reference to the accompanying drawings.

Figure 1:
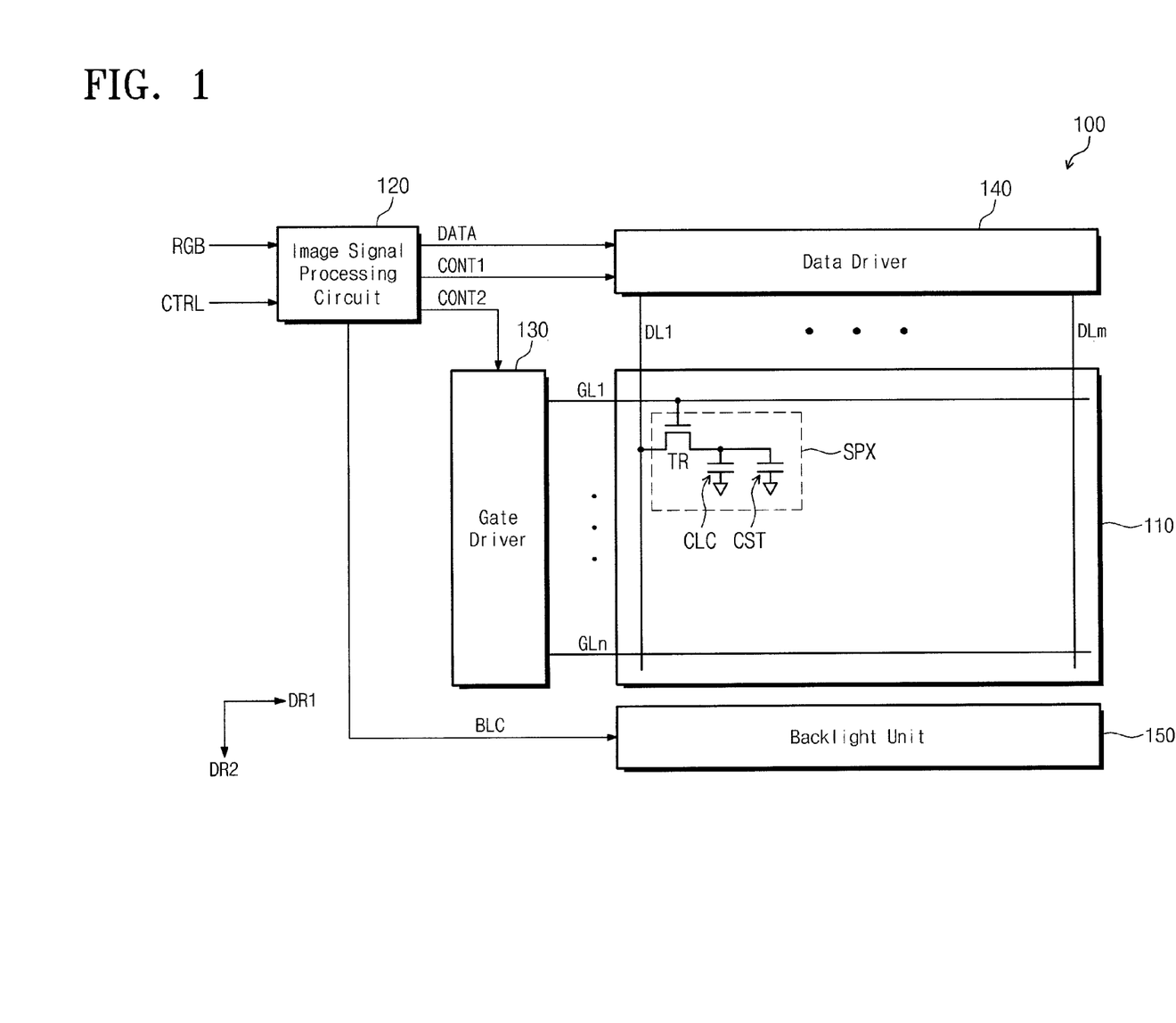
FIG. 1 is a block diagram illustrating a display device according to an embodiment of the inventive concept.

FIG. 1 is a block diagram illustrating a display device according to an embodiment of the inventive concept.

Referring to FIG. 1, a display device 100 includes a display panel 110, an signal processing circuit 120, a gate driver 130, a data driver 140, and a backlight unit (or backlight) 150.

The display panel 110 displays images. The display panel 110 may be a liquid crystal display panel; however, embodiments of the inventive concept are not limited thereto. For example, the display panel 110 may be any suitable type (kind) of display panel that utilizes the backlight unit 150.

The display panel 110 includes a plurality of gate lines GL1 to GLn extending in a first direction DR1, a plurality of data lines DL1 to DLm extending in a second direction DR2, and a plurality of sub-pixels SPX arranged at regions where the plurality of gate lines GL1 to GLn and the plurality of data lines DL1 to DLm cross one another. The plurality of data lines DL1 to DLm and the plurality of gate lines GL1 to GLn are insulated from each other. Each of the sub-pixels SPX includes a thin film transistor TR, a liquid crystal capacitor CLC, and a storage capacitor CST.

The plurality of sub-pixels PX is formed of the same structure. Accordingly, as a configuration of one sub-pixel is described, description of each of the sub-pixels SPX is not repeated. The thin film transistor TR of the sub-pixel SPX includes a gate electrode connected to the first gate line GL1 among the plurality of gate lines GL1 to GLn, a source electrode connected to the first data line DL1 among the plurality of data lines DL1 to DLm, and a drain electrode connected to the liquid crystal capacitor CLC and the storage capacitor CST. One end (e.g., one terminal or electrode) of each of the liquid crystal capacitor CLC and the storage capacitor CST is connected to the drain electrode of the thin film transistor TR. The other end of each of the liquid crystal capacitor CLC and the storage capacitor CST is connected to a common voltage. That is, the liquid crystal capacitor CLC and the storage capacitor CST are connected in parallel.

The signal processing circuit 120 receives an image signal RGB and a control signal CTR from the outside (e.g., from an external circuit or device). The control signals CTRL, for example, include a vertical sync signal, a horizontal sync signal, a main clock signal, and a data enable signal. The signal processing circuit 120 converts an image signal into a data signal DATA to correspond to an operating condition of the display panel 110. The signal processing circuit 120 outputs a first control signal CONT1 and a second control signal CONT2 on the basis of a control signal CTRL. The signal processing circuit 120 provides the data signal DATA and the first control signal CONT1 to the data driver 140 and provides the second control signal CONT2 to the gate driver 130. The first control signal CTRL1 includes a horizontal sync start signal, a clock signal, and a line latch signal, and the second control signal CTRL2 includes a vertical sync start signal and a clock signal. The signal processing circuit 120 may change the data signal DATA (e.g., in a variety of ways) according to the arrangement of the sub-pixels SPX in the display panel 110 and a display frequency, and then output the changed data signal DATA. The signal processing circuit 120 outputs a backlight control signal BLC for controlling the backlight unit 150.

The gate driver 130 drives the gate lines GL1 to GLn in response to the second control signal CTRL2 from the signal processing circuit 120. The gate driver 130 includes a gate driving integrated circuit (IC). The gate driver 130 may be implemented with a circuit using an oxide semiconductor, an amorphous semiconductor, a crystalline semiconductor, a polycrystalline semiconductor, and/or the like, and may be formed in a set or predetermined area of the display panel 110.

The data driver 140 provides a driving voltage to the data lines DL1 to DLm in response to the data signal DATA and the first control signal CONT1 from the signal processing circuit 120.

The backlight unit 150 may be arranged at a lower part of the display panel 110 to face the sub-pixels SPX or may be arranged at one side of the display panel 110. The backlight unit 150 operates in response to the backlight control signal BLC from the signal processing circuit 120.

Figure 2:
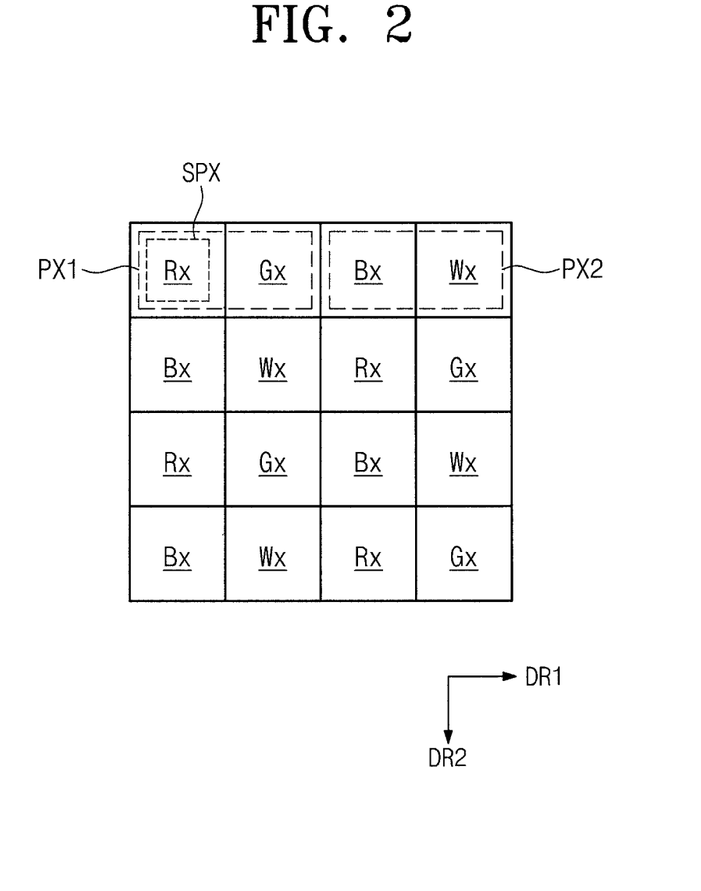
FIG. 2 is a view illustrating an arrangement of pixels provided to a display panel shown in FIG. 1.

FIG. 2 is a view illustrating an arrangement of pixels provided to a display panel shown in FIG. 1.

Referring to FIG. 2, the display panel 110 includes a first pixel PX1 and a second pixel PX2. The first pixel PX1 includes two sub-pixels SPX, that is, a first sub-pixel Rx and a second sub-pixel Gx. The second pixel PX2 includes two sub-pixels SPX, that is, a third sub-pixel Bx and a fourth sub-pixel Wx. The first pixel PX1 and the second pixel PX2 are arranged sequentially and alternately in the first direction DR1 and in the same manner, are sequentially and alternately arranged in the second direction DR2.

In this specification, although the first to fourth sub-pixels Rx, Gx, Bx, and Wx are described on the basis of the display panel 110 where RGBW displaying red, green, blue, and white colors are applied, the inventive concept is also applied to a display panel where multi-primary colors (e.g., RGBY, RGBC, CMYW, and so on) are applied.

Figure 3:
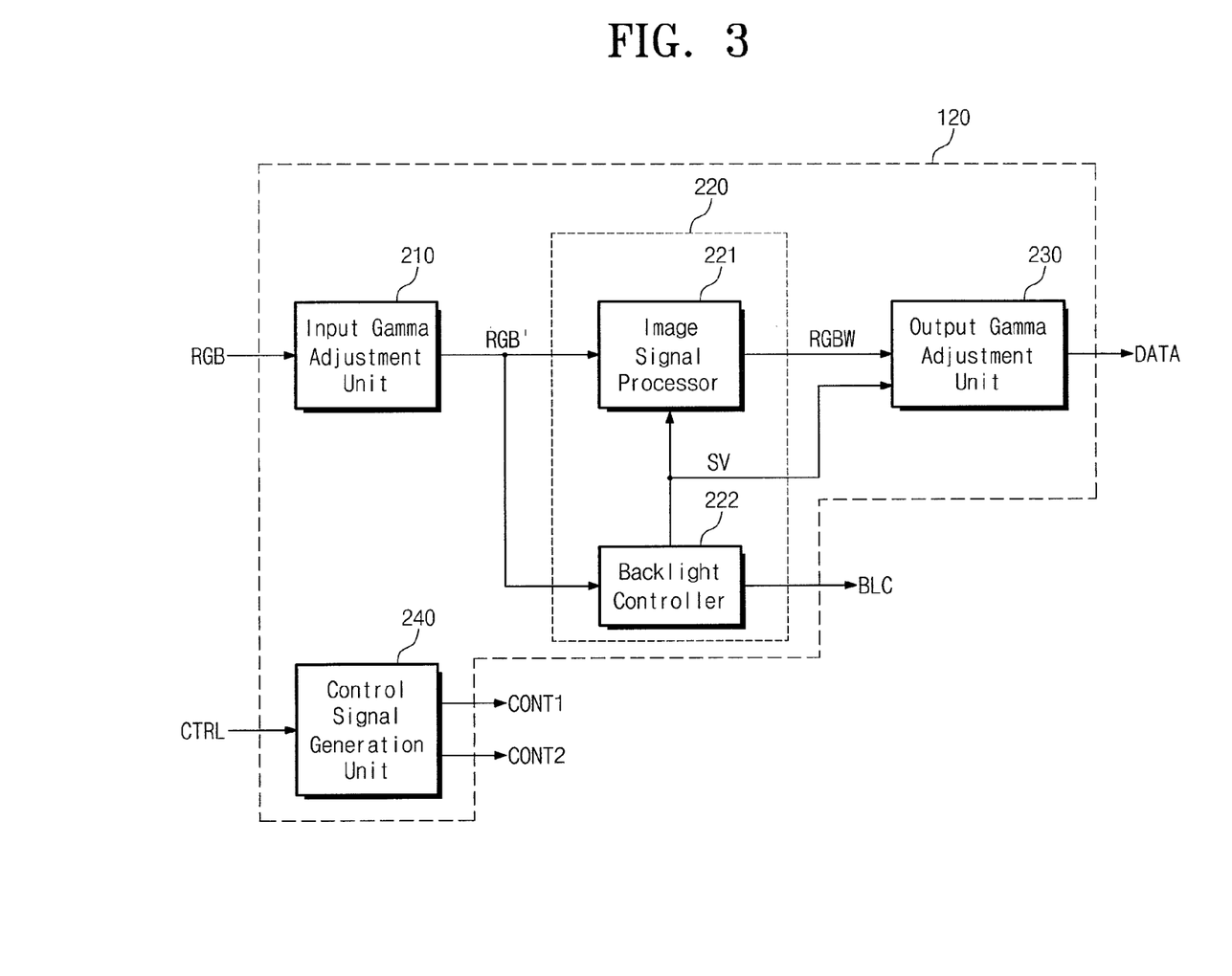
FIG. 3 is a block diagram illustrating a configuration of an image signal processing circuit shown in FIG. 1.

FIG. 3 is a block diagram illustrating a configuration of a signal processing circuit 120 shown in FIG. 1.

Referring to FIG. 3, the signal processing circuit 120 includes an input gamma adjustment unit (e.g., an input gamma adjuster) 210, an image signal processing unit (image signal processor) 220, an output gamma adjustment unit (e.g., an output gamma adjuster) 230, and a control signal generation unit (e.g., a control signal generator) 240.

The input gamma adjustment unit 210 receives an image signal RGB from the outside (e.g., from an external circuit or device). The input gamma adjustment unit 210 outputs a gamma adjustment image signal RGB' in order to allow the gamma characteristics of the image signal RGB to be proportional to brightness. The gamma adjustment image signal RGB' includes a first color signal, a second color signal, and a third color signal. In this embodiment, the first color signal, the second color signal, and the third color signal include a red signal R, a green signal G, and a blue signal B, respectively.

The image signal processing unit 220 includes an image signal processing circuit 221 and a backlight controller 222. The backlight controller 222 generates a histogram corresponding to the image characteristics of the gamma adjustment image signal RGB' and generates a backlight control signal BLC on the basis of the generated histogram. The backlight control signal BLC is provided to the backlight unit 150 shown in FIG. 1. Additionally, the backlight controller 222 provides a scaling signal SV, which corresponds to the backlight control signal BLC, to the image signal processing circuit 221.

The image signal processing circuit 221 receives the gamma adjustment image signal RGB' and converts the gamma adjustment image signal RGB' into an intermediate data signal RGBW in response to the scaling signal SV from the backlight controller 222. For example, the image signal processing circuit 221 may map the gamma adjustment image signal RGB' into a RGBW signal including a white signal W in addition to the red signal R, the green signal G, and the blue signal B. The image signal processing circuit 221 may adjust the brightness of the mapped RGBW signal in response to the scaling signal SV and output the intermediate data signal RGBW through rendering.

The image signal processing unit 220 may dynamically change the brightness of the backlight unit 150 shown in FIG. 1 and a grayscale level of the intermediate data signal RGBW according to the image characteristics of the image signal RGB. For example, when the image signal RGB has first type (kind) image characteristics, the image signal processing unit 220 may set the brightness of the backlight unit 150 to a 50% level and maintain the grayscale level of the intermediate data signal RGBW in a 100% grayscale level of the gamma adjustment image signal RGB'. When the image signal RGB has second type (kind) image characteristics, the image signal processing unit 220 may set the brightness of the backlight unit 150 to a 100% level and scale down the grayscale level of the intermediate data signal RGBW to 50% of a grayscale level of the gamma adjustment image signal RGB'.

The output gamma adjustment unit 230 outputs a data signal DATA by applying an inverse gamma function to the intermediate data signal RGBW in response to the scaling signal SV from the backlight controller 222. The data signal DATA is provided to the data driver 130 shown in FIG. 1.

Figure 4:
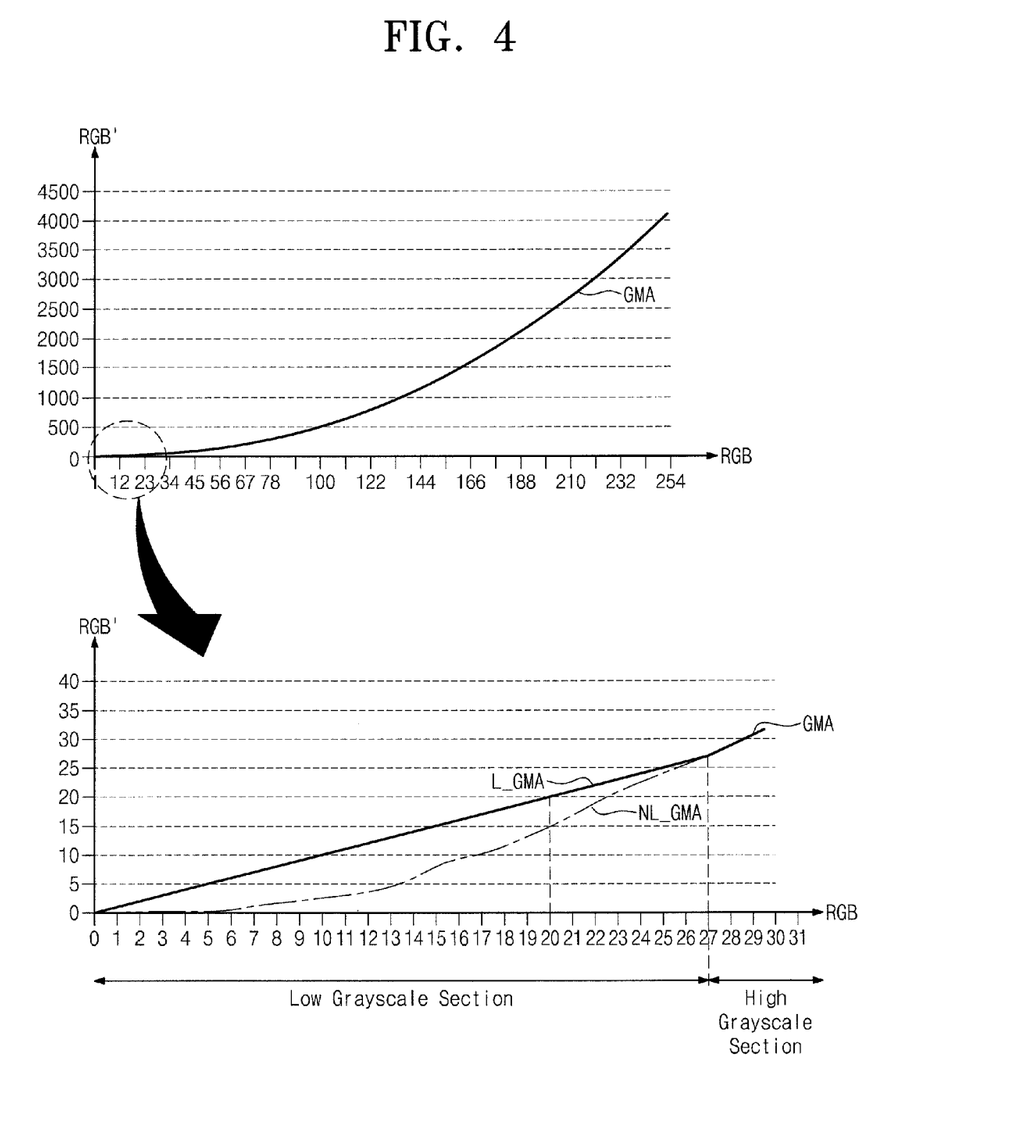
FIG. 4 illustrates a gamma adjustment operation of an input gamma adjustment unit shown in FIG. 3.
Figure 5:
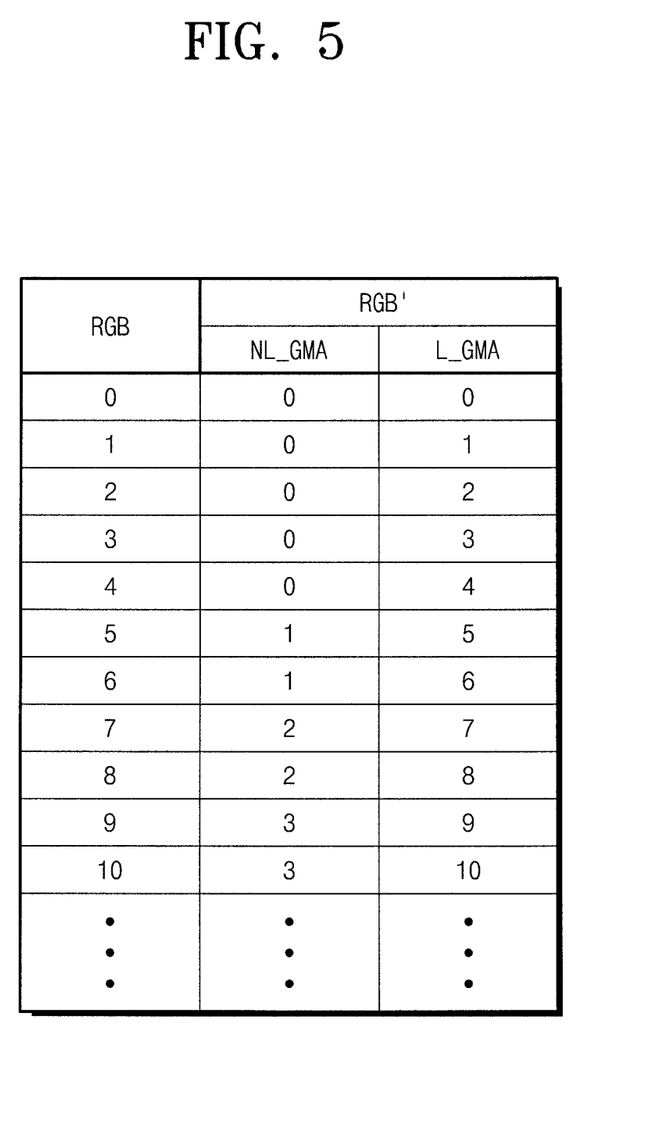
FIG. 5 is a table illustrating a gamma adjustment image signal according to a non-linear gamma curve and a gamma adjustment image signal according to a linear gamma curve, among gamma curves shown in FIG. 4.

FIG. 4 illustrates a gamma adjustment operation of an input gamma adjustment unit 210 shown in FIG. 3. FIG. 5 is a table illustrating a gamma adjustment image signal according to a non-linear gamma curve and a gamma adjustment image signal according to a linear gamma curve, among gamma curves shown in FIG. 4.

Referring to FIGS. 3 and 4, the input gamma adjustment unit 210 outputs a gamma adjustment image signal RGB' to allow the gamma characteristics of the image signal RGB to be proportional to the brightness. The input gamma adjustment unit 210 may convert the image signal RGB into the gamma adjustment image signal RGB' by referring to a gamma curve GMA.

When an extent of a grayscale level of the image signal RGB is 256 levels, it is assumed that a section having less than a 27 grayscale level is a low grayscale section. As the image signal RGB is included in a low grayscale section, if the image signal RGB is converted into the gamma adjustment image signal RGB' by referring to a non-linear gamma curve NL_GMA in order to allow the gamma characteristics of the image signal RGB to be proportional to the brightness, a gradation aggregation phenomenon may occur due to quantization errors.

For example, if the image signal RGB is converted into the gamma adjustment image signal RGB' by referring to a non-linear gamma curve NL_GMA, as shown in FIG. 5, when a grayscale level of the image signal RGB is 0, 1, 2, 3, and 4, the gamma adjustment image signal RGB' is all converted into the gamma adjustment image signal RGB' of a zeroth grayscale level and when a grayscale level of the image signal RGB is 5 and 6, the gamma adjustment image signal RGB' is all converted to the gamma adjustment image signal RGB' of a first grayscale level.

Therefore, when the image signal RGB is included in a low grayscale section, the input gamma adjustment unit 210 may convert the image signal RGB into the gamma adjustment image signal RGB' by referring to the linear gamma curve L_GMA.

Figure 6:
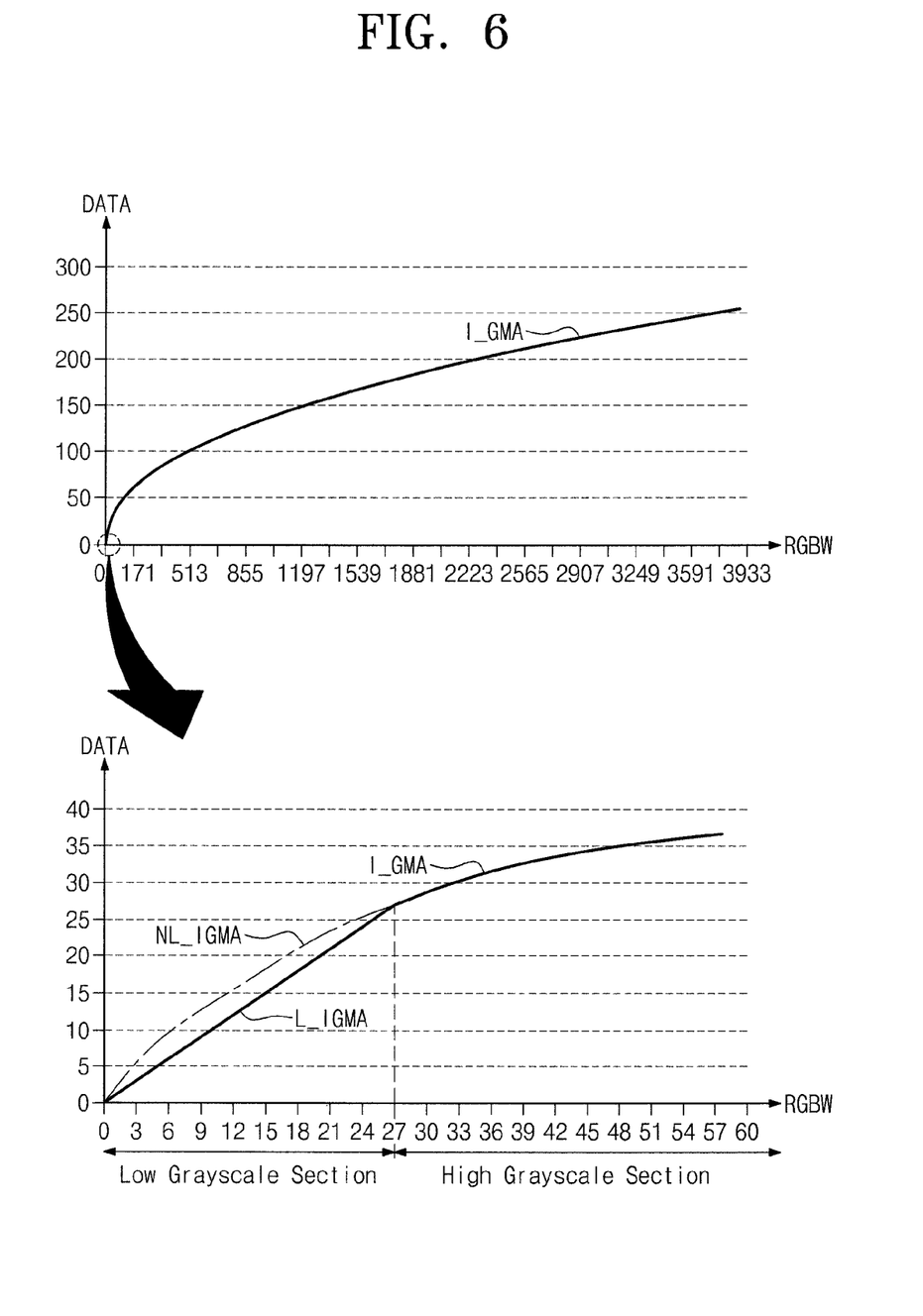
FIG. 6 illustrates a gamma adjustment operation of an output gamma adjustment unit shown in FIG. 3.

FIG. 6 illustrates a gamma adjustment operation of an output gamma adjustment unit 230 shown in FIG. 3.

Referring to FIGS. 3 and 6, the output gamma adjustment unit 230 may convert the intermediate data signal RGBW into the data signal DATA by referring to a gamma curve GMA of the input gamma adjustment unit 210 and a complementary inverse gamma curve I-GMA.

When the image signal RGB is included in a low scale section, because the input gamma adjustment unit 210 converts the image signal RGB into the gamma adjustment image signal RGB' by referring the linear gamma curve L_GMA, the output gamma adjustment unit 230 may convert the intermediate data signal RGBW into the data signal DATA with respect to a low grayscale section of the intermediate data signal RGBW by referring to a linear inverse gamma curve L_IGMA instead of a non-linear inverse gamma curve NL_IGAM.

Figure 7:
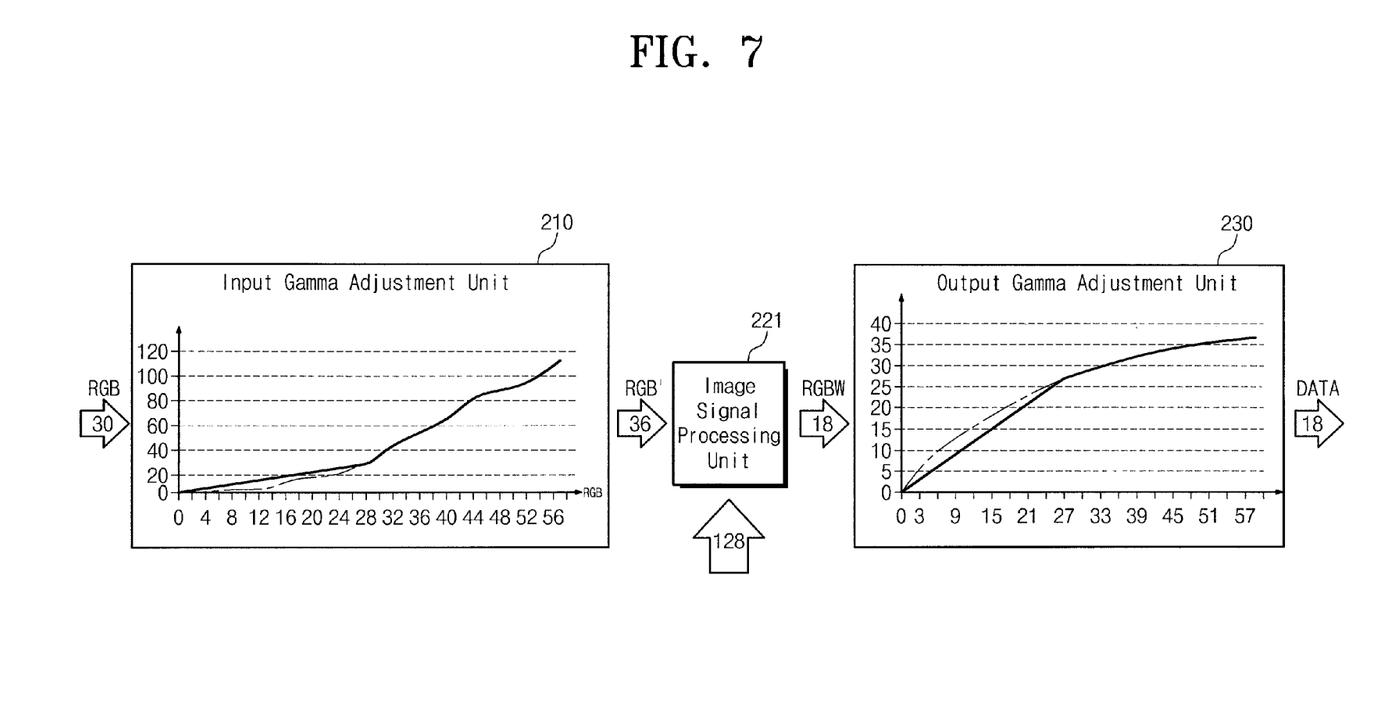
FIG. 7 is a block diagram illustrating an operation of an image signal processing unit shown in FIG. 3.

FIG. 7 is a block diagram illustrating an operation of an image signal processing circuit shown in FIG. 3.

Referring to FIG. 7, the input gamma adjustment unit 210 may output the gamma adjustment image signal RGB' having a bit width of 12 bits by receiving an image signal RGB, having a bit width of 8 bits. For example, when a grayscale level of an image signal RGB having a bit width of 8 bits is 30, the input gamma adjustment unit 210 may output a gamma adjustment image signal RGB' having a bit width of 12 bits and a grayscale level of 36.

The image signal processing circuit 221 converts the gamma adjustment image signal RGB' into an intermediate data signal RGBW in response to a scaling signal SV. For example, the scaling signal SV, which has a bit width of 8 bits, is a scaling range of 256 levels. When the gamma adjustment image signal RGB' is scaled down by 50%, the scaling signal SV is set to 128.

When a grayscale level of the gamma adjustment image RGB' is 36 and the scaling signal SV is 128, the image signal processing unit 220 outputs an intermediate data signal RGBW having grayscale level of 18.

The output gamma adjustment unit 230 converts the intermediate data signal RGBW having the grayscale level of 18 into a data signal DATA having a bit width of 8 bits. At this point, the intermediate data signal RGBW having a grayscale level of 18 is included in a low grayscale section, as shown in FIG. 6, and the data signal DATA having a grayscale level of 18 may be outputted based on a linear inverse gamma curve L_I-GMA.

As a result, in relation to the signal processing circuit 120 shown in FIG. 3, the image signal RGB having a grayscale level of 30 may result in the output of the data signal DATA having a grayscale level of 18. In such a case, because a grayscale deflection phenomenon in which a grayscale level is further lowered in a low grayscale section of the data signal DATA occurs, the quality of a display image may be deteriorated.

Figure 8:
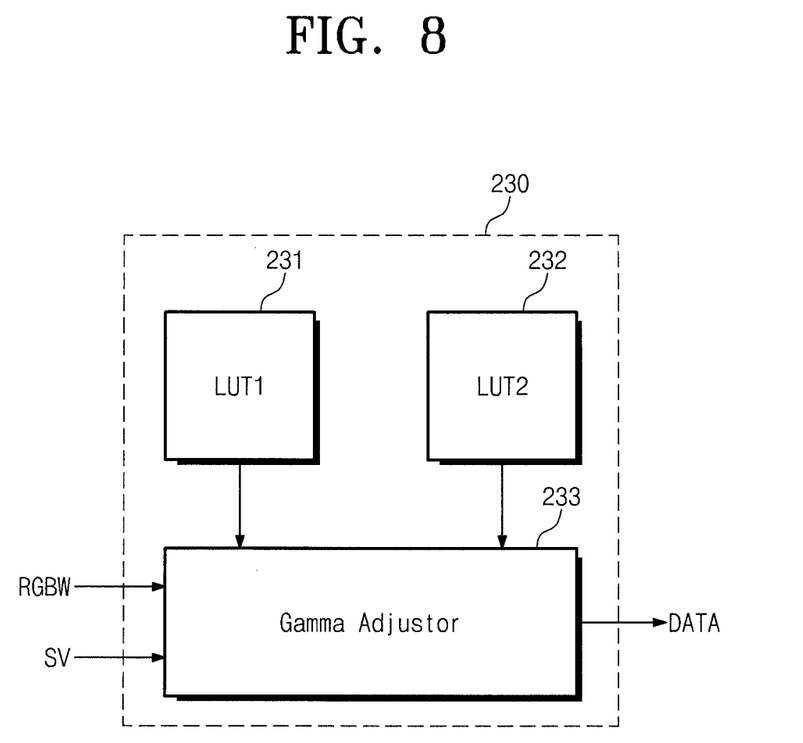
FIG. 8 is a block diagram illustrating a configuration of an output gamma adjustment unit shown in FIG. 3.

FIG. 8 is a block diagram illustrating a configuration of an output gamma adjustment unit 230 shown in FIG. 3.

Referring to FIG. 8, the output gamma adjustment unit 230 includes a first memory 231 for storing a first lookup table LUT1, a second memory 232 for storing a second lookup table LUT2, and a gamma adjustor 923.

The first lookup table LUT1 of the first memory 231 stores a conversion value corresponding to the linear inverse gamma curve L_IGMA shown in FIG. 6. The second lookup table LUT2 of the second memory 232 stores a conversion value corresponding to the non-linear inverse gamma curve NL_IGMA shown in FIG. 6.

The gamma adjustor 233 converts an intermediate data signal RGBW into a data signal DATA on the basis of the first lookup table LUT1 of the first memory 231, the second lookup table LUT2 of the second memory 232, and a scaling signal SV.

When the intermediate data signal RGBW is included in a low grayscale section, the gamma adjustor 233 converts the intermediate data signal RGBW into the data signal DATA by the following Equation 1. When the intermediate data signal RGBW is included in a high grayscale section, the gamma adjustor 233 converts the intermediate data signal RGBW into the data signal DATA on the basis of the second lookup table LUT2 of the second memory 232.

$$y = LUT1(x) + \frac{[LUT2(x) - LUT1(x)] \times (S - SV)}{S/2} \qquad \text{Equation 1}$$

In Equation 1, x is the intermediate data signal RGBW, y is the data signal DATA, and S is the maximum scaling value. In Equation 1, the maximum scaling value of the scaling signal SV, which has a bit width of 8 bits, is 256. When 100% of a grayscale level of the intermediate data signal RGBW is converted into the data signal DATA, a scaling value of the scaling signal SV is 256 and when 50% of a grayscale level of the intermediate data signal RGBW is converted into the data signal DATA, a scaling value of the scaling signal SV is 128.

When the intermediate data signal RGBW is included in a low scale section, a gamma deflection phenomenon may be improved by converting the intermediate data signal RGBW into the data signal DATA with reference to the first lookup table LUT1 corresponding to the linear inverse gamma curve L_IGMA and the second lookup table LUT2 corresponding to the non-linear inverse gamma curve NL_I-GMA.

For example, as described above, when the image signal RGB is changed from first type (kind) image characteristics to second type (kind) image characteristics, the image signal processing unit 220 shown in FIG. 3 may raise the brightness of the backlight unit 150 from a 50% level to a 100% level and scale down a grayscale level of the intermediate data signal RGBW from 100% of the gamma adjustment image signal RGB' to 50%. At this point, in order to prevent a user from detecting or perceiving a change in the image, the image signal processing unit 220 gradually changes the scaling signal SV during a transition region.

Figure 9:
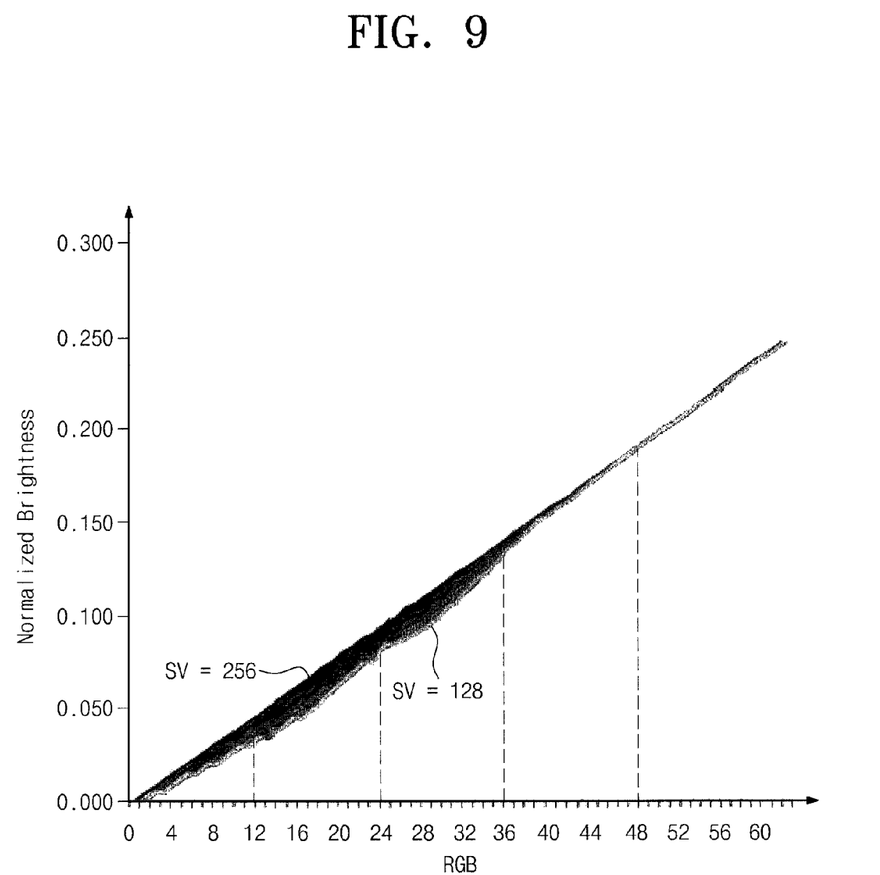
FIG. 9 is a graph illustrating normalized brightness characteristics of an image displayed on a display panel when an image signal processing unit shown in FIG. 3 gradually changes a scaling signal.

FIG. 9 is a graph illustrating normalized brightness characteristics of an image displayed on a display panel when an image signal processing unit 220 shown in FIG. 3 gradually changes a scaling signal. According to an embodiment shown in FIG. 9, it is assumed that when the intermediate data signal RGBW is included in a low grayscale section, the gamma adjustor 233 shown in FIG. 8 converts the intermediate data signal RGBW into the data signal DATA by referring to only the first lookup table LUT1 corresponding to the linear inverse gamma curve L_I-GMA.

Referring to FIGS. 3, 8, and 9, when the image signal processing unit 220 gradually changes the scaling signal SV, the brightness of an image displayed on the display panel 110 shown in FIG. 1 may vary. When a brightness change is large, a user may detect the brightness change.

Figure 10:
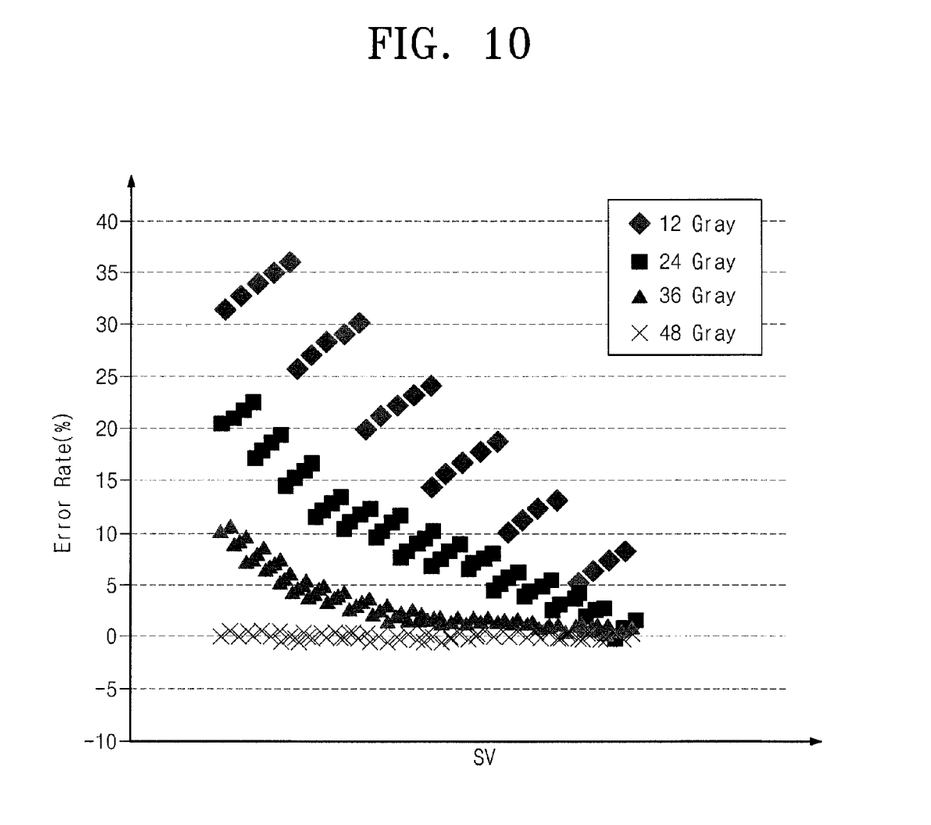
FIG. 10 is a graph illustrating an error rate according to a change in a scaling signal in the embodiment shown in FIG. 9.

FIG. 10 is a graph illustrating an error rate according to a change in scaling signal in the embodiment shown in FIG. 9.

Referring to FIGS. 9 and 10, for example, when a grayscale level is 12, 24, 36, or 48, an error rate is changed as the scaling signal SV is changed.

The error rate may be calculated by Equation 2.

$$\text{Error rate (\%)} = ((B\_MAX - B\_Change)/B\_MAX) \times 100 \quad \text{Equation 2}$$

In Equation 2, B_MAX is a brightness of an image displayed on the display panel 110 when the scaling signal SV is the maximum scaling value S, B_Change is a brightness of an image displayed on the display panel 110 when the scaling signal SV is changed. The scaling signal SV having a bit width of 8 bits has a scaling range of 256 levels and S=256. When SV=256, a grayscale level of the intermediate data signal RGBW maintains 100% of a gray scale level of the gamma adjustment image signal RGB'. That is, the error rate refers to a brightness change when the scaling signal is reduced from a 100% level into a level lower than that.

As shown in FIG. 10, as a grayscale level decreases, the error rate increases. A high error rate in a low grayscale section means that an input gamma is adjusted by using the linear gamma curve I-GMA in the low grayscale section and an output gamma is adjusted by using the linear inverse gamma curve L_I-GMA.

Figure 11:
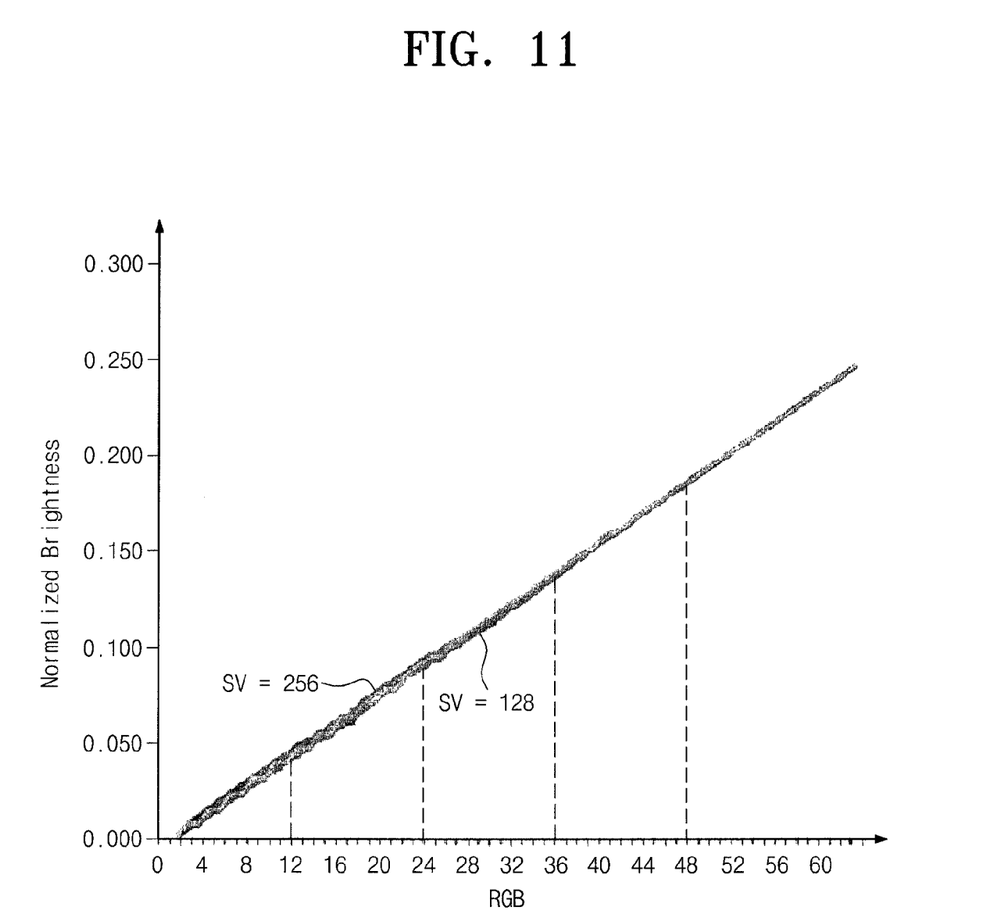
FIG. 11 is a graph illustrating normalized brightness characteristics of an image displayed on a display panel when an image signal processing unit shown in FIG. 3 gradually changes a scaling signal.

FIG. 11 is a graph illustrating normalized brightness characteristics of an image displayed on a display panel when an image signal processing unit 220 shown in FIG. 3 gradually changes a scaling signal. According to an embodiment shown in FIG. 11, when the intermediate data signal RGBW is included in a low grayscale section, the gamma adjustor 233 shown in FIG. 8 converts the intermediate data signal RGBW into the data signal DATA by referring to the second lookup table LUT2 corresponding to the non-linear inverse gamma curve NL_IGMA in addition to the first lookup table LUT1 corresponding to the linear inverse gamma curve L_I-GMA.

Referring to FIGS. 3, 8, and 11, when the image signal processing unit 220 gradually changes the scaling signal SV, the brightness of an image displayed on the display panel 110 shown in FIG. 1 may vary. However, according to the embodiment shown in FIG. 11, rather than the embodiment shown in FIG. 9, a brightness difference due to a change in scaling signal SV is reduced with respect to the same grayscale level. For example, when a grayscale level of the image signal RGB is 24, it is shown that a difference between a brightness when SV=256 and a brightness when SV=128 shown in FIG. 9 is reduced more than a difference between a brightness when SV=256 and a brightness when SV=128 shown in FIG. 11.

Figure 12:
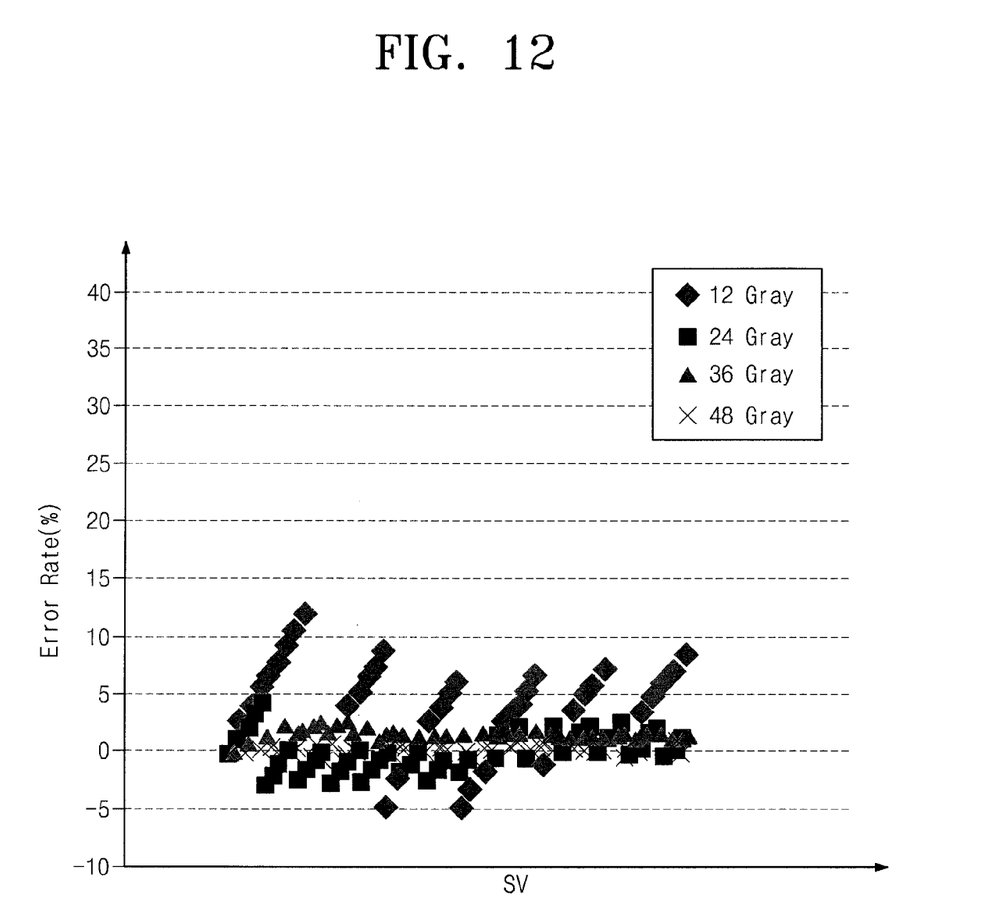
FIG. 12 is a graph illustrating an error rate according to a change in scaling signal in the embodiment shown in FIG. 11.

FIG. 12 is a graph illustrating an error rate according to a change in scaling signal in the embodiment shown in FIG. 11.

Referring to FIGS. 11 and 12, when a grayscale level is 12, 24, 36, and 48, an error rate is changed as the scaling signal SV is changed. As a grayscale level decreases, an error rate increases, however, it is shown that the error rate shown in FIG. 12 is reduced more than the error rate shown in FIG. 10.

That is, when the intermediate data signal RGBW is included in a low grayscale section, the gamma adjustor 233 shown in FIG. 8 may reduce an error rate by converting the intermediate data signal RGBW into the data signal DATA by referring to the second lookup table LUT2 corresponding to the non-linear inverse gamma curve NL_IGMA in addition to the first lookup table LUT1 corresponding to the linear inverse gamma curve L_I-GMA.

An output gamma adjustment unit in an image signal processing circuit having such a configuration may convert an intermediate data signal into a data signal on the basis of a first lookup table (which is based on a first gamma curve), a second lookup table (which is based on a second gamma curve), and a scaling signal. Therefore, the quality deterioration of a display image may be reduced or prevented in a low grayscale section of an intermediate data signal.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A signal processing circuit comprising:
   an input gamma adjuster configured to adjust gamma characteristics of an image signal and to output a gamma adjustment image signal;
   an image signal processor configured to generate a scaling signal corresponding to image characteristics of the gamma adjustment image signal and to convert the gamma adjustment image signal into an intermediate data signal in response to the scaling signal; and
   an output gamma adjuster configured to convert the intermediate data signal into a data signal on a basis of a first lookup table corresponding to a first gamma curve, a second lookup table corresponding to a second gamma curve, and the scaling signal,
   wherein the image signal processor comprises:
      a backlight controller configured to generate a scaling signal corresponding to the image characteristics of the gamma adjustment image signal, and to generate a backlight control signal corresponding to the image characteristics; and
      an image signal processing circuit configured to convert the gamma adjustment image signal into the intermediate data signal in response to the scaling signal.

2. The signal processing circuit of claim 1, wherein the input gamma adjuster is configured to convert the image signal into the gamma adjustment image signal by referring to a linear gamma curve when the image signal is in a low grayscale section, and to convert the image signal into the gamma adjustment image signal by referring to a non-linear gamma curve when the image signal is in a high grayscale section.

3. The signal processing circuit of claim 1, wherein the first gamma curve is a linear inverse gamma curve and the second gamma curve is a non-linear inverse gamma curve.

4. The signal processing circuit of claim 3, wherein the output gamma adjuster is configured to convert the intermediate data signal into the data signal on a basis of the first lookup table, the second lookup table, and the scaling signal when the intermediate data signal is in a low grayscale section, and to convert the intermediate data signal into the data signal on a basis of the second lookup table when the intermediate data signal is in a high grayscale section.

5. The signal processing circuit of claim 1, wherein the output gamma adjuster comprises:
a first memory configured to store the first lookup table;
a second memory configured to store the second lookup table; and
a gamma adjustor configured to convert the intermediate data signal into a data signal on a basis of the first lookup table, the second lookup table, and the scaling signal.

6. The signal processing circuit of claim 1, wherein the image signal comprises a first color signal, a second color signal, and a third color signal, and the intermediate data signal comprises the first color signal, the second color signal, the third color signal, and a fourth color signal.

7. A signal processing circuit comprising:
an input gamma adjuster configured to adjust gamma characteristics of an image signal and to output a gamma adjustment image signal;
an image signal processor configured to generate a scaling signal corresponding to image characteristics of the gamma adjustment image signal and to convert the gamma adjustment image signal into an intermediate data signal in response to the scaling signal; and
an output gamma adjuster configured to convert the intermediate data signal into a data signal on a basis of a first lookup table corresponding to a first gamma curve, a second lookup table corresponding to a second gamma curve, and the scaling signal,
wherein the output gamma adjuster outputs a value calculated by $LUT1(x)+[\{(LUT2(x)-LUT1(x))\times(S-SV)\}/(S/2)]$ as the data signal,
where x is the intermediate data signal, LUT1 is the first lookup table, LUT2 is the second lookup table, SV is the scaling signal, and S is a maximum scaling value.

8. A display device comprising:
a display panel comprising a plurality of pixels configured to display an image corresponding to each data signal; and
a signal processing circuit configured to receive an image signal and to convert the image signal into the data signal to provide the converted data signal to the display panel,
wherein the signal processing circuit comprises:
an input gamma adjuster configured to adjust gamma characteristics of the image signal and to output a gamma adjustment image signal;
an image signal processor configured to generate a scaling signal corresponding to image characteristics of the gamma adjustment image signal and to convert the gamma adjustment image signal into an intermediate data signal in response to the scaling signal; and
an output gamma adjuster configured to convert the intermediate data signal into a data signal on a basis of a first lookup table and utilizing a first gamma curve, a second lookup table and utilizing a second gamma curve, and the scaling signal,
wherein the image signal processor comprises:
a backlight controller configured to generate a scaling signal corresponding to the image characteristics of the gamma adjustment image signal, and to generate a backlight control signal corresponding to the image characteristics; and
an image signal processing circuit configured to convert the gamma adjustment image signal into the intermediate data signal in response to the scaling signal.

9. The display device of claim 8, wherein the input gamma adjuster is configured to convert the image signal into the gamma adjustment image signal by referring to a linear gamma curve when the image signal is in a low grayscale section, and to convert the image signal into the gamma adjustment image signal by referring to a non-linear gamma curve when the image signal is in a high grayscale section.

10. The display device of claim 8, wherein the first gamma curve is a linear inverse gamma curve and the second gamma curve is a non-linear inverse gamma curve.

11. The display device of claim 10, wherein the output gamma adjuster is configured to convert the intermediate data signal into the data signal on a basis of the first lookup table, the second lookup table, and the scaling signal when the intermediate data signal is in a low grayscale section, and to convert the intermediate data signal into the data signal on a basis of the second lookup table when the intermediate data signal is in a high grayscale section.

12. The display device of claim 8, wherein the output gamma adjuster outputs a value calculated by $LUT1(x)+[\{(LUT2(x)-LUT1(x))\times(G-SV)\}/(G/2)]$ as the data signal,
where x is the intermediate data signal, LUT1 is the first lookup table, LUT2 is the second lookup table, SV is the scaling signal, and G is a maximum grayscale level.

13. The display device of claim 8, wherein the image signal corresponding to each of the plurality of pixels comprises a first color signal, a second color signal, and a third color signal, and the intermediate data signal corresponding to each of the plurality of pixels comprises the first color signal, the second color signal, the third color signal, and a fourth color signal.

14. The display device of claim 13, wherein a first pixel among the plurality of pixels comprises a first sub-pixel and a second sub-pixel respectively corresponding to the first color signal and the second color signal, and
wherein a second pixel among the plurality of pixels comprises a third sub-pixel and a fourth sub-pixel respectively corresponding to the third color signal and the fourth color signal.

15. The display device of claim 14, wherein the first pixel and the second pixel are adjacent to each other.

16. The display device of claim 8, further comprising:
a gate driver configured to sequentially select the plurality of pixels of the display panel;
a data driver configured to provide a driving voltage corresponding to the data signal to pixels selected by the gate driver from among the plurality of pixels; and
a backlight configured to provide light to the display panel in response to the backlight control signal.

* * * * *